(12) United States Patent
Morimoto et al.

(10) Patent No.: US 8,628,077 B2
(45) Date of Patent: Jan. 14, 2014

(54) PAPER FEEDING DEVICE AND IMAGE FORMING APPARATUS

(71) Applicant: Sharp Kabushiki Kaisha, Osaka (JP)

(72) Inventors: Yasumasa Morimoto, Osaka (JP); Toshiki Ohgita, Osaka (JP); Sohichi Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/631,198

(22) Filed: Sep. 28, 2012

(65) Prior Publication Data
US 2013/0082438 A1   Apr. 4, 2013

(30) Foreign Application Priority Data
Sep. 29, 2011 (JP) .................................. 2011-213622

(51) Int. Cl.
*B65H 3/06* (2006.01)
(52) U.S. Cl.
USPC .......................................... 271/117; 271/118
(58) Field of Classification Search
USPC .................................................. 271/117, 118
See application file for complete search history.

(56) References Cited

U.S. PATENT DOCUMENTS

2005/0225022 A1* 10/2005 Akiyama et al. ........... 271/10.03

FOREIGN PATENT DOCUMENTS

| JP | 9-100041 A | | 4/1997 |
| JP | 2001-220026 A | * | 8/2001 |
| JP | 2003-102197 A | | 4/2003 |
| JP | 2005-8379 A | | 1/2005 |
| JP | 2005-303610 A | * | 10/2005 |

\* cited by examiner

*Primary Examiner* — David H Bollinger
(74) *Attorney, Agent, or Firm* — Birch, Stewart, Kolasch & Birch, LLP

(57) ABSTRACT

ADF includes a pickup roller, an arm, a regulatory member, a drive motor and a control section. The pickup roller is supported at shaft thereof by the arm swung between a lowered position and a raised position. The drive motor supplies a driving force for the swing to the arm. The regulatory member constrains the arm from moving upward across the raised position. The control section sets a setting-speed of the drive motor to a first speed by which much importance is attached to the reduction of driving noise of the drive motor when a first driving factor causing the arm to move from the neighborhood of the raised position occurs, and sets the setting-speed to a second speed by which much importance is attached to the reduction of contact noise with the regulatory member when a second driving factor causing the arm to move from the lowered position occurs.

11 Claims, 12 Drawing Sheets

FIG.9

| | ARM | CONTENTS |
|---|---|---|
| FIRST DRIVING FACTOR | NEIGHBORHOOD OF RAISED POSITION | POWER TURNED ON |
| | | RETURN FROM POWER CONSERVATION MODE |
| | | ADF CLOSED AFTER ONCE OPENED |
| SECOND DRIVING FACTOR | LOWERED POSITION | PAPER FEEDING COMPLETED |
| | | MAINTENANCE DOOR CLOSED AFTER ONCE OPENED |

FIG.12

| | ARM | CONTENTS |
|---|---|---|
| FIRST DRIVING FACTOR | NEIGHBORHOOD OF RAISED POSITION | POWER TURNED ON |
| | | RETURN FROM POWER CONSERVATION MODE |
| SECOND DRIVING FACTOR | LOWERED POSITION | PAPER FEEDING COMPLETED |
| | | PAPER FEED CASSETTE MOUNTED |

PAPER FEEDING DEVICE AND IMAGE FORMING APPARATUS

CROSS REFERENCE

This Nonprovisional application claims priority under 35 U.S.C. §119(a) on Patent Application No. 2011-213622 filed in Japan on Sep. 29, 2011, the entire contents of which are hereby incorporated by reference.

BACKGROUND OF THE INVENTION

1. Field of the Invention

The present invention relates to a paper feeding device having a pickup roller movable upward and downward, and to an image forming apparatus provided with the same.

2. Description of the Related Art

Among paper feeding devices that feed a sheet substance having an image to be read or a sheet substance onto which an image is to be formed, there are ones in which a pickup roller is provided that retreats to a retreat position higher than a maximum loading height of the sheet substances at the time when the sheet substance(s) are set, after the job is completed and so forth and descends to a paper feeding position so as to come into contact with the sheet substance(s) at the time when a paper feeding is in operation. The pickup roller is supported at shaft thereof by an end portion of an arm capable of being swung; and thereby, the pickup roller is caused to be disposed at the retreat position when the arm is disposed at a raised position, and the pickup roller is caused to be disposed at the paper feeding position when the arm is disposed at a lowered position. The lowered position is determined at the time of the arm's downward movement by the height at which the pickup roller comes into contact with the top surface of a bunch of sheet substances loaded, and the raised position is determined at the time of the arm's upward movement by a predetermined height at which a regulatory member that constrains the arm from moving upward is disposed.

The arm moves, being supplied with a driving force from a drive motor, upward and downward between the raised position and the lowered position. To the drive motor is inputted a drive signal to cause the arm to move upward and downward by a predetermined amount at respective preset speeds. The arm is held at the raised position at the time other than when the paper feeding is in operation; however, it can fall down by a small amount from the predetermined raised position due to vibration and/or the like. For this reason, the arm initializes its position by moving upward to the position limited by the regulatory member with a predetermined timing within which the arm is considered to have fallen down from the raised position, and starts moving downward from the predetermined raised position when the paper feeding is brought to operation.

Because there is a demand for the speedup of the time spent from a request for the paper feed until a paper sheet is actually fed at the time of the arm's downward movement, and because rotative torque for the paper feed is necessary when the downward movement of the arm and the rotational movement of the pickup roller operate together, a high speed and more torque are required. Further, among such paper feeding devices are ones in which speeds of the upward movement and the downward movement are the same. On that account, there is a risk that big contact noises may occur accompanying the upward and downward movements.

So, among conventional paper feeding devices is one in which the arm is caused to decrease the speed of its downward motion halfway in the course of its movement from the raised position to the lowered position in an attempt to reduce the contact noise produced at the time when the pickup roller comes into contact with the sheet substance(s) (for example, refer to Japanese Patent Unexamined Publication No. 2001-220026 bulletin).

Nevertheless, the above mentioned conventional paper feeding device is incapable of reducing the contact noise produced when the arm comes into contact with the regulatory member at the time of the arm's upward movement. Additionally, there is also a driving noise that the drive motor itself produces, and loudness of the driving noise varies depending on the rotational speed it drives at; however, conventional paper feeding devices have been incapable of reducing the driving noise of the drive motor.

The present invention is directed to providing a paper feeding device capable of reducing noises such as contact noise and driving noise produced when a pickup roller is moved upward, and an image forming apparatus provided with the same.

SUMMARY OF THE INVENTION

A paper feeding device of the present invention includes a pickup roller, an arm, a regulatory member, a drive motor and a control section. The pickup roller performs a paper feeding operation of sending a sheet substance off by rotating while maintaining contact with the sheet substance. The arm, of which first end portion is supported at shaft thereof by an apparatus frame and of which second end portion supports a pickup roller at shaft thereof, is capable of being swung between a lowered position at which the pickup roller comes into contact with the sheet substance and a predetermined raised position at which the pickup roller is separate from the sheet substance. The drive motor supplies a driving force for the swing to the arm. The regulatory member constrains the arm from moving upward across the raised position. The control section sets a setting-speed for the drive motor to a first predetermined speed by which much importance is attached to the reduction of a driving noise of the drive motor when a first drive factor occurs that causes the arm to move upward from the neighborhood of the raised position to the raised position, and sets a setting-speed for the drive motor to a second predetermined speed by which much importance is attached to the reduction of a contact noise with the regulatory member when a second drive factor occurs that causes the arm to move upward from the lowered position to the raised position.

With this configuration, the contact noise with the regulatory member decreases because the drive motor is set to the second speed when the arm is moved upward from the lowered position to the raised position. Also, when the arm is caused to move upward from the neighborhood of the raised position to the raised position, the drive motor is set to the first speed; however, the drive motor never reaches the first speed before the arm is restricted by the regulatory member because a swing distance of the arm is short, so that the contact noise with the regulatory member never becomes big even when the setting-speed is made high. For this reason, with the drive motor set to the first speed when the arm moves upward from the neighborhood of the raised position to the raised position, the driving noise of the drive motor is reduced without causing the contact noise with the regulatory member to become big.

Further, with regard to a drive signal that is inputted to the drive motor so as to move the arm upward or downward, to make sure that the arm is moved to the raised position or the lowered position, it is common for the drive signal to be set to such a value that allows the arm to be swung within an angle greater than the angle within which the arm is to be swung. On that account, when the arm moves upward from the neighborhood of the raised position to the raised position, there is a time in which the drive motor continues driving even after the arm is constrained from moving upward by the regulatory member; however, the driving noise of the drive motor in this time decreases because of the drive motor rotating at the first speed.

The present invention allows for reducing noises produced when a pickup roller is moved upward.

BRIEF DESCRIPTION OF THE DRAWINGS

FIG. 9 is a diagram illustrating each of first driving factors and second driving factors.

FIG. 12 is a diagram illustrating each of first driving factors and second driving factors when the paper feeding device of the present invention is applied to a paper feeding section of the image forming apparatus.

DETAILED DESCRIPTION OF THE INVENTION

Figure 1:
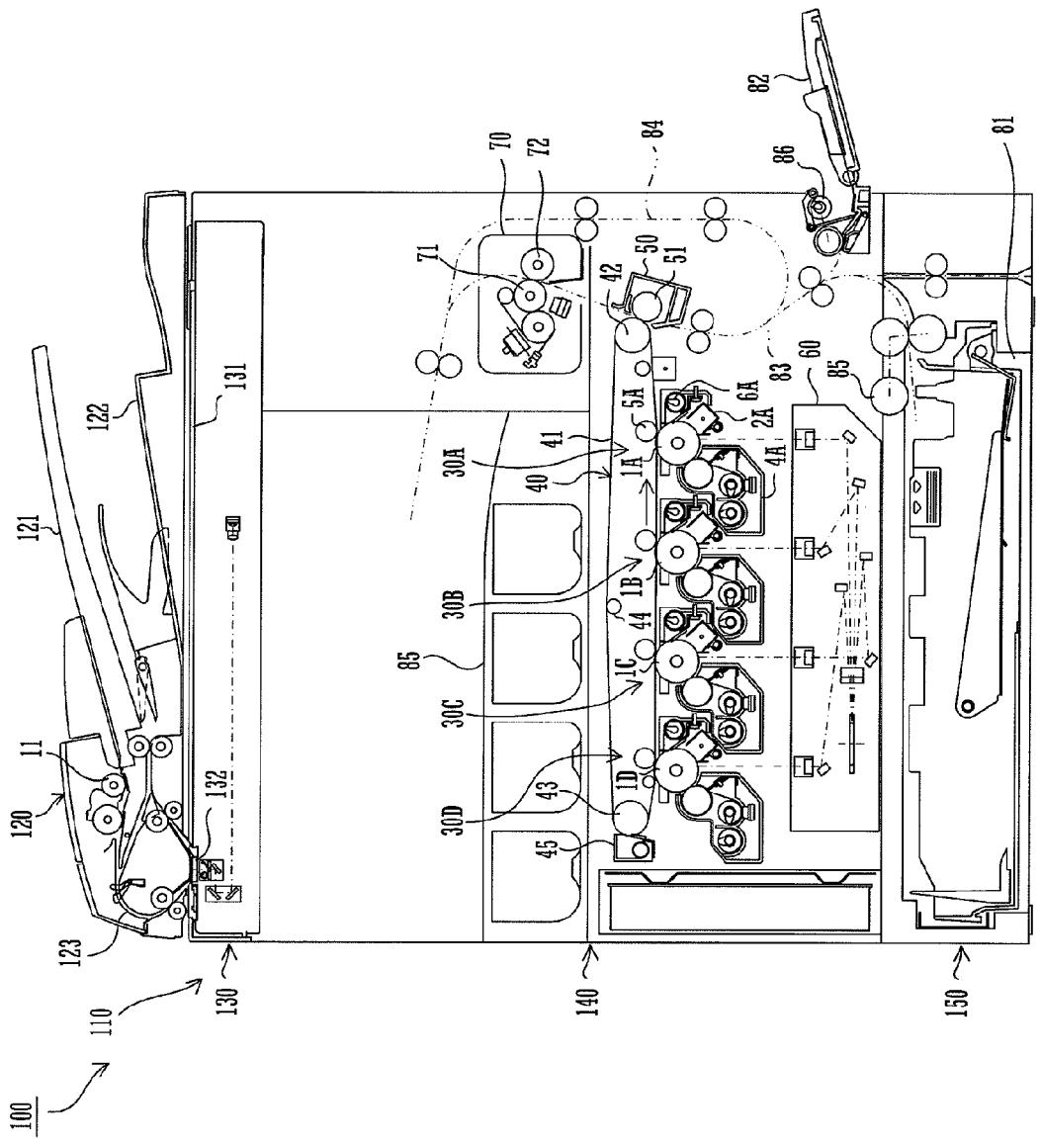
FIG. 1 is a sectional view showing a general configuration of an image forming apparatus to which a paper feeding device according to an embodiment of the present invention is applied.
Figure 2:
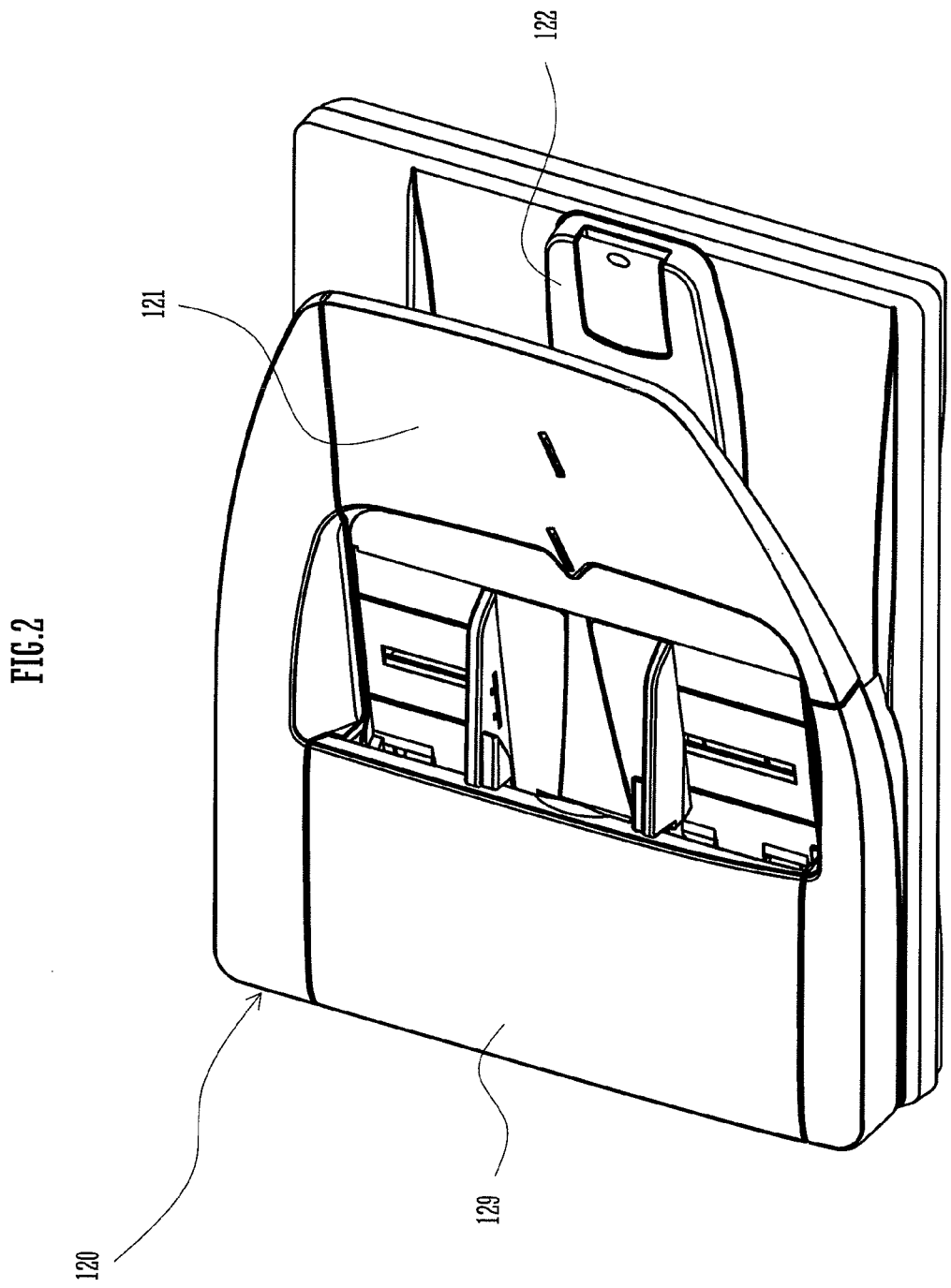
FIG. 2 is a perspective view of an ADF which is an example of the paper feeding device.

An embodiment of the present invention is explained below referring to the drawings. As shown in FIG. 1, the image forming apparatus 100 includes a main body 110 and an automatic document feeder (ADF: Automatic Document Feeder) 120. The ADF 120 is an example of the paper feeding device. The image forming apparatus 100 forms a multi-colored or monochromatic image onto a paper sheet based on image data produced from a document or image data inputted from outside. The document is an example of a sheet substance fed by the paper feeding device. For the paper, normal paper, photographic paper, and sheet recording medium such as OHP film can be exemplified.

The ADF 120 is disposed on the main body 110, and is configured in such a manner that its edge portion on the front face's side can be swung in upward and downward directions with its edge portion on the rear face's side being supported at its shaft by the main body 110.

The main body 110 includes an image reading section 130, an image forming section 140 and a paper feeding section 150.

The image reading section 130 is disposed in the upper part of the main body 110, and its top surface includes a first document table 131 and a second document table 132. The top surfaces of the first document table 131 and the second document table 132 are capable of being opened and closed by the ADF 120. In fixed document reading mode, the image reading section 130 reads an image of the document placed on the first document table 131, and produces image data. And in conveyed document reading mode, the ADF 120 conveys the documents received in a document load tray 121 piece by piece to a document receiving tray 122 via the top surface of the second document table 132; then the image reading section 130 reads an image of the document conveyed by way of the top surface of the second document table 132, and produces image data.

The image forming section 140 includes an optical scanner 60, four image forming stations 30A, 30B, 30C, 30D, an intermediate transfer unit 40, a secondary transfer unit 50, a fuser unit 70 and a paper discharge tray 85, and performs an image forming process onto a paper sheet.

The intermediate transfer unit 40 has an intermediate transfer belt 41, a drive roller 42, an idle roller 43 and a tension roller 44. The intermediate transfer belt 41 is passed over the drive roller 42, the idle roller 43 and the tension roller 44 and tensioned therewith, and forms a loop-like path of movement.

The image forming section 140 forms, at the image forming stations 30A through 30D, toner images (developer images) of respective hues of the four colors consisting of black, along with cyan, magenta, and yellow which are the three primary colors of the subtractive color mixture obtained from the color separation of a color image. The image forming stations 30A through 30D are aligned along the path of movement of the intermediate transfer belt 41. The image forming stations 30B through 30D are substantially configured in the same manner as the image forming station 30A.

The image forming station 30A for black includes a photoreceptor drum 1A, an electrostatic charger 2A, a developing device 4A, a primary transfer roller 5A and a cleaning unit 6A.

The photoreceptor drum 1A rotates in a predetermined direction with a driving force transmitted thereto. The electrostatic charger 2A causes a circumferential surface of the photoreceptor drum 1A to be charged to a predetermined electrostatic potential.

The optical scanner 10 projects respective laser beams modulated by image data on the respective hues consisting of black, cyan, magenta and yellow onto the respective photoreceptor drums 1A, 1B, 1C, 1D of the image forming stations 30A through 30D. On the circumferential surfaces of the photoreceptor drums 1A through 1D are respectively formed electrostatic latent images based on the image data on the respective hues consisting of black, cyan, magenta and yellow.

The developing device 4A supplies a black toner (developer), which is the hue for the image forming station 30A, to the circumferential surface of the photoreceptor drum 1A, thereby rendering the electrostatic latent image visible in a black toner image.

An outer circumferential surface of the intermediate transfer belt 41 sequentially faces the circumferential surfaces of the photoreceptor drums 1A through 1D. The primary transfer roller 5A is disposed at a position opposed to the photoreceptor drum 1A across the intermediate transfer belt 41. Positions at which the intermediate transfer belt 41 and the photoreceptor drums 1A through 1D are opposed to each other are the positions where primary transfers are performed.

To the primary transfer roller 5A, a primary transfer bias of a polarity (for example, plus) reverse to an electrostatic charge polarity (for example, minus) of the toner is applied with a constant voltage control. The same applies to the image forming stations 30B through 30D. This causes the toner images of respective hues formed on the respective circumferential surfaces of the photoreceptor drums 1A through 1D to undergo the primary transfers sequentially in such a manner as to be superimposed onto the outer circumferential surfaces of the intermediate transfer belt 41, thereby causing to form a full-color toner image on the outer circumferential surface of the intermediate transfer belt 41.

However, when image data on only part of the hues consisting of black, cyan, magenta and yellow are inputted, electrostatic latent image(s) and toner image(s) are formed only at part of the drums corresponding to the part of the hues of the inputted image data among the four photoreceptor drums 1A through 1D, and thus only the toner image(s) of the part of the hues undergoes primary transfer(s) onto the outer circumferential surface of the intermediate transfer belt 41.

The cleaning unit 6A collects the toner remaining on the circumferential surface of the photoreceptor drum 1A after the development and primary transfer.

The toner images that have undergone the primary transfers onto the outer circumferential surface of the intermediate transfer belt 41 at the respective primary transfer positions are conveyed by the rotating intermediate transfer belt 41 to a secondary transfer position at which the intermediate transfer belt 41 and a secondary transfer roller 51 that is installed in the secondary transfer unit are opposed to each other.

The paper feeding section 150 includes a paper feed cassette 81, a hand-fed paper tray 82, a first paper conveying path 83 and a second paper conveying path 84.

In the paper feed cassette 81 are received paper sheets of size and kind with a relatively high frequency in use. The paper sheets received in the paper feed cassette 81 are fed by a pickup roller 85, and then supplied to the first paper conveying path 83 piece by piece.

Onto the hand-fed paper tray 82 are placed paper sheets of size and kind with a relatively low frequency in use. The paper sheets placed onto the hand-fed paper tray 82 are fed by a pickup roller 86, and then supplied to the first paper conveying path 83 piece by piece.

The first paper conveying path 83 is configured so as to reach a paper discharge tray 85 from each of the paper feed cassette 81 and the hand-fed paper tray 82 by way of the secondary transfer position and the fuser unit 70. The second paper conveying path 84, which is a paper conveying path for duplex printing, is configured in such a manner that a paper sheet on which face on one side an image forming has been performed is conveyed, with faces on both sides thereof turned, again to the secondary transfer position.

The secondary transfer roller 51 is in contacted with the drive roller 42 with a predetermined nip pressure sandwiching the intermediate transfer belt 41 in between.

When the paper sheet fed from the paper feeding section 150 is conveyed by way of the secondary transfer position, a secondary transfer bias of a polarity (for example, plus) reverse to an electrostatic charge polarity (for example, minus) of the toner is applied to the secondary transfer roller 51 with a constant voltage control; and this causes the toner image borne on the outer circumferential surface of the intermediate transfer belt 41 to undergo a secondary transfer onto the paper sheet.

The toner remaining on the intermediate transfer belt 41 after the toner image has been transferred onto the paper sheet is collected by an intermediate transfer belt cleaning unit 45.

The paper sheet onto which the toner image has been transferred is led to the fuser unit 70. The fuser unit 70, being provided with a heating roller 71 and a pressing roller 72, heats and presses the paper sheet passing between the heating roller 71 and the pressing roller 72, thereby fixing the toner image on the paper sheet. The paper sheet on which the toner image has been fixed is discharged onto the paper discharge tray 85 with the face on which the toner image has been fixed facing downward.

As shown in FIG. 2 through FIG. 6, the ADF 120 includes, in addition to the document load tray 121 and the document receiving tray 122, a document conveying path 123, a pickup roller 11, a conveyance roller 12, a separation roller 124, a plurality of sending rollers 125, 126, 127, 128 and a maintenance door 129.

The document load tray 121 is disposed above the document receiving tray 122. The document conveying path 123 is formed in the shape of U-character so as to reach the document receiving tray 122 from the document load tray 121 by way of the top surface of the second document table 132.

The pickup roller 11 has a circumferential surface made of rubber, and is disposed at an edge portion on the downstream side of the document load tray 121 in a document conveying direction. The conveyance roller 12 is disposed on the downstream side of the pickup roller 11 in the document conveying direction.

Figure 7:
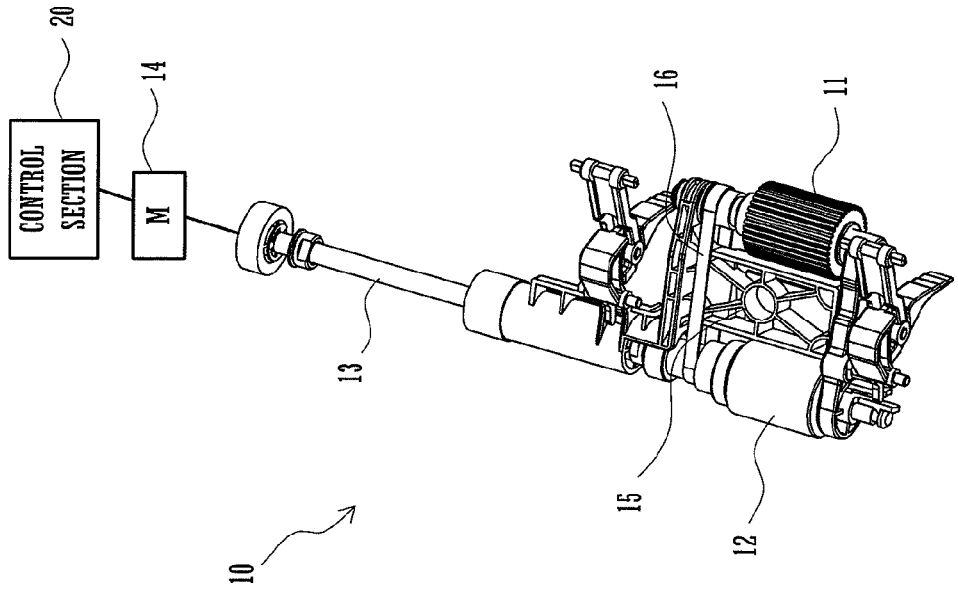
FIG. 7 is a perspective view of a pickup roller lift mechanism.

Shown in FIG. 7 is a pickup roller lift mechanism 10. The pickup roller lift mechanism 10 includes the pickup roller 11, the conveyance roller 12, a drive shaft 13, a drive motor 14, an arm 15 and an endless belt 16.

The conveyance roller 12 rotates with the drive shaft 13. The drive shaft 13 is rotatably supported by an apparatus frame of the ADF 120. The drive shaft 13 rotates with a driving force supplied thereto from the drive motor 14. Driving of the drive motor 14 is controlled by a control section 20.

A first end portion of the arm 15 along the document conveying direction rotates around the drive shaft 13. The arm 15 supports the pickup roller 11 at shaft thereof with a second end portion on the opposite side of the first end portion along the document conveying direction. The endless belt 16 is passed over the drive shaft 13 and the rotating shaft of the pickup roller 11 and tensioned therewith. A turning force of the drive shaft 13 is transmitted to the pickup roller 11 through the endless belt 16.

Figure 3:
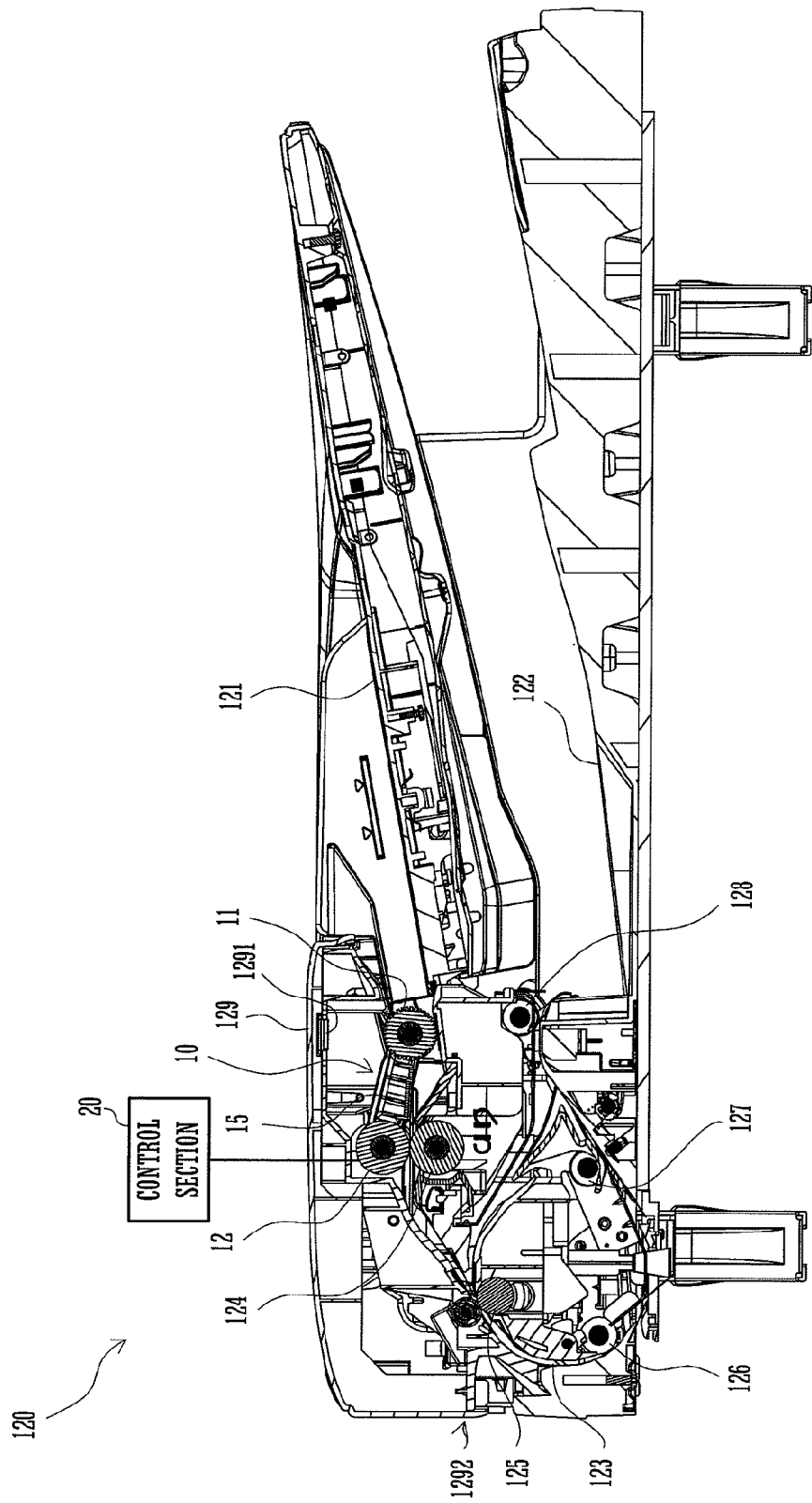
FIG. 3 is a sectional view of the ADF in a state where an arm is at a lowered position.
Figure 4:
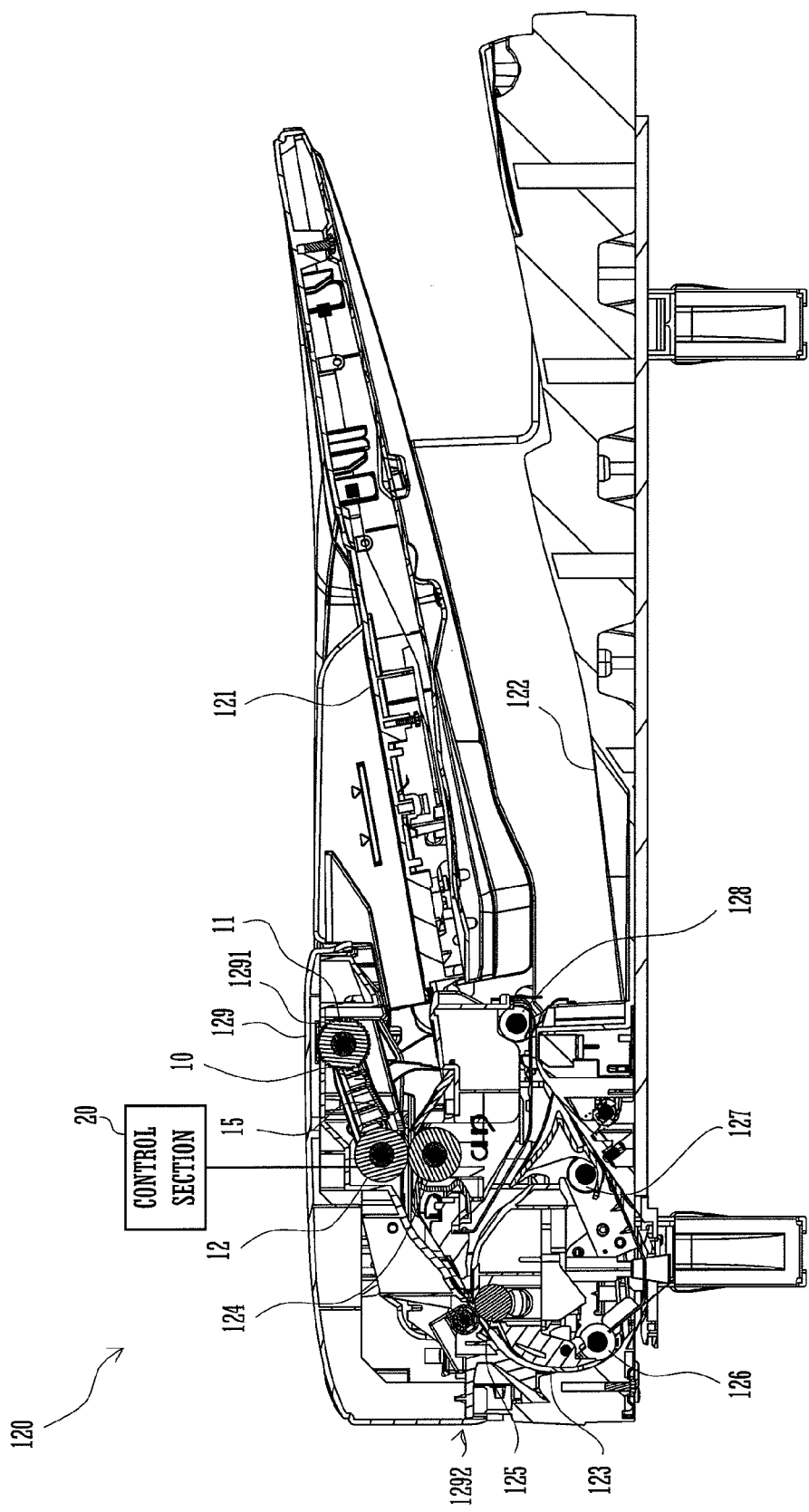
FIG. 4 is a sectional view of the ADF in a state where the arm is at a raised position.

With a driving force transmitted from the drive motor 14 through the drive shaft 13, the arm 15 is configured so as to be capable of being swung between a lowered position at which the pickup roller 11 comes into contact with the document as shown in FIG. 3 and a predetermined raised position at which the pickup roller 11 is separate from the document as shown in FIG. 4. When the arm 15 is disposed at the lowered position, the pickup roller 11 is caused to be disposed at a paper feeding position; and when the arm 15 is disposed at the raised position, the pickup roller 11 is caused to be disposed at a retreat position.

Figure 6:
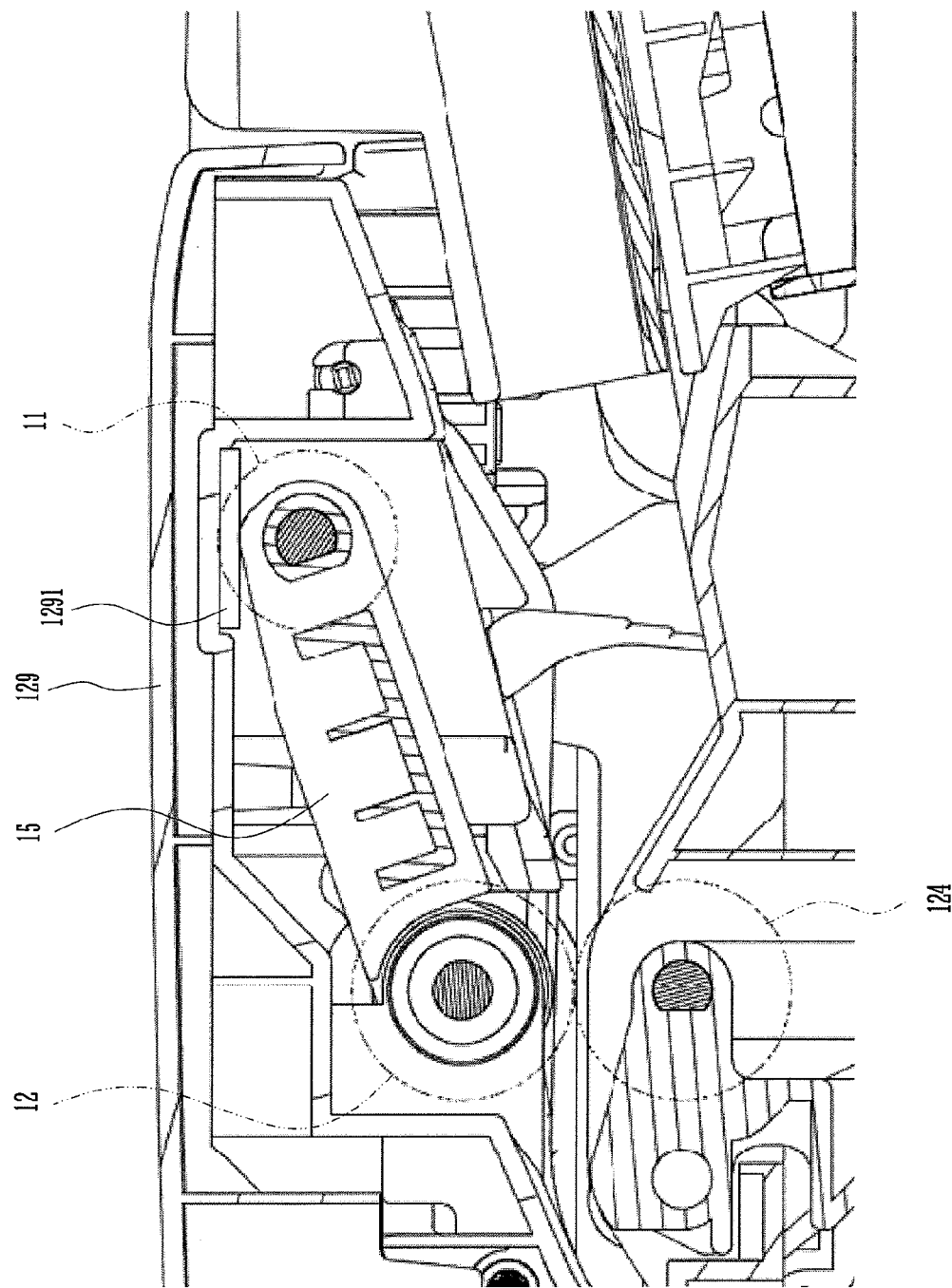
FIG. 6 is an enlarged view of a part of the ADF.

As shown in FIG. 6, the maintenance door 129 is disposed above the pickup roller lift mechanism 10. The maintenance door 129 has a regulatory member 1291 on a bottom surface above the second end portion of the arm 15 supporting the pickup roller 11 at shaft thereof. At the time of the upward movement, the arm 15 is constrained from moving upward across the raised position when the second end portion comes into contact with the regulatory member 1291, thereby being positioned at the raised position. For example, for the regulatory member 1291, a buffering member such as cushioning member like a sponge and/or plate member made of polyurethane is used.

The maintenance door 129 is configured so as to be openable and closable around an edge portion on the left side in FIG. 3 between an open position and a closed position that respectively exposes to and covers from the outside the pickup roller lift mechanism 10 and about half the region of the document conveying path 123 on the upstream side. The maintenance door 129 positioned at the open position permits carrying out maintenance tasks such as removal of document(s) causing a jam and/or replacement of parts.

When the maintenance door 129 is positioned at the open position, the driving force is not transmitted between drive motor and the drive shaft 13; therefore, in a case where the maintenance door 129 is closed after it was once opened, the arm 15 is disposed at the lowered position as shown in FIG. 3.

Figure 5:
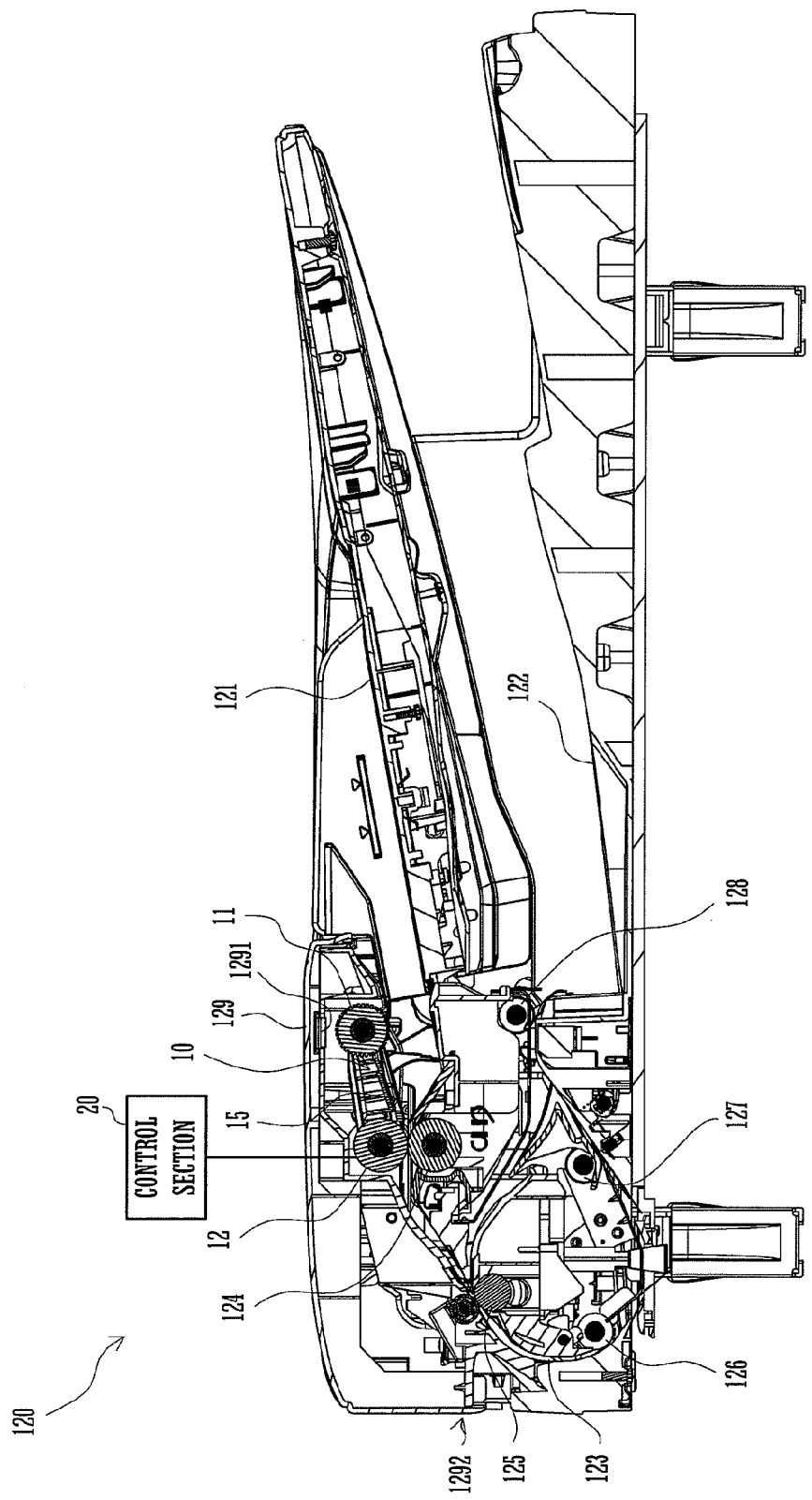
FIG. 5 is a sectional view of the ADF in a state where the arm is in the neighborhood of the raised position.

Additionally, when the ADF 120 is opened and closed for the placement of a document onto the first document table 131, the arm 15 can fall down slightly from the raised position as shown in FIG. 5 due to vibration and/or the like. For this reason, the arm initializes its position by moving upward to the position limited by the regulatory member 1291 with a predetermined timing within which the arm is considered to have fallen down from the raised position, and then start moving downward from the predetermined raised position when a paper feeding is brought to operation.

The pickup roller 11 performs the paper feeding operation of sending a document off to the document conveying path 123 by rotating while maintaining contact with the document received in the document load tray 121.

The separation roller 124 is in contact with the conveyance roller 12 from the lower side with pressure. The document(s) fed by the pickup roller 11 is sent to a space between the conveyance roller 12 and the separation roller 124, and is conveyed to further downstream side in the document conveying path 123 after being separated into piece by piece by the function of the conveyance roller 12 and the separation roller 124. The document is conveyed in the document conveying path 123 by the sending rollers 124 through 128, and is discharged onto the document receiving tray 122.

Subsequently, control of drive when the arm 15 is moved upward and downward is explained.

When the arm 15 is moved downward, the control section 20 outputs, to the drive motor 14, a drive signal in a first excitation mode by which much importance is attached to the torque. As an example, the first excitation mode is a two phase excitation mode. For example, the control section 20, when it causes the arm 15 to move downward, outputs to the drive motor 14 a drive signal of speed 912.83 pps (pulse per second), amount of rotation 150 pulses in the two phase excitation mode. Outputting the drive signal in two phase excitation mode when the arm 15 is moved downward allows for obtaining more torque in the paper feeding operation as compared with one-two phase excitation mode.

Figure 8:
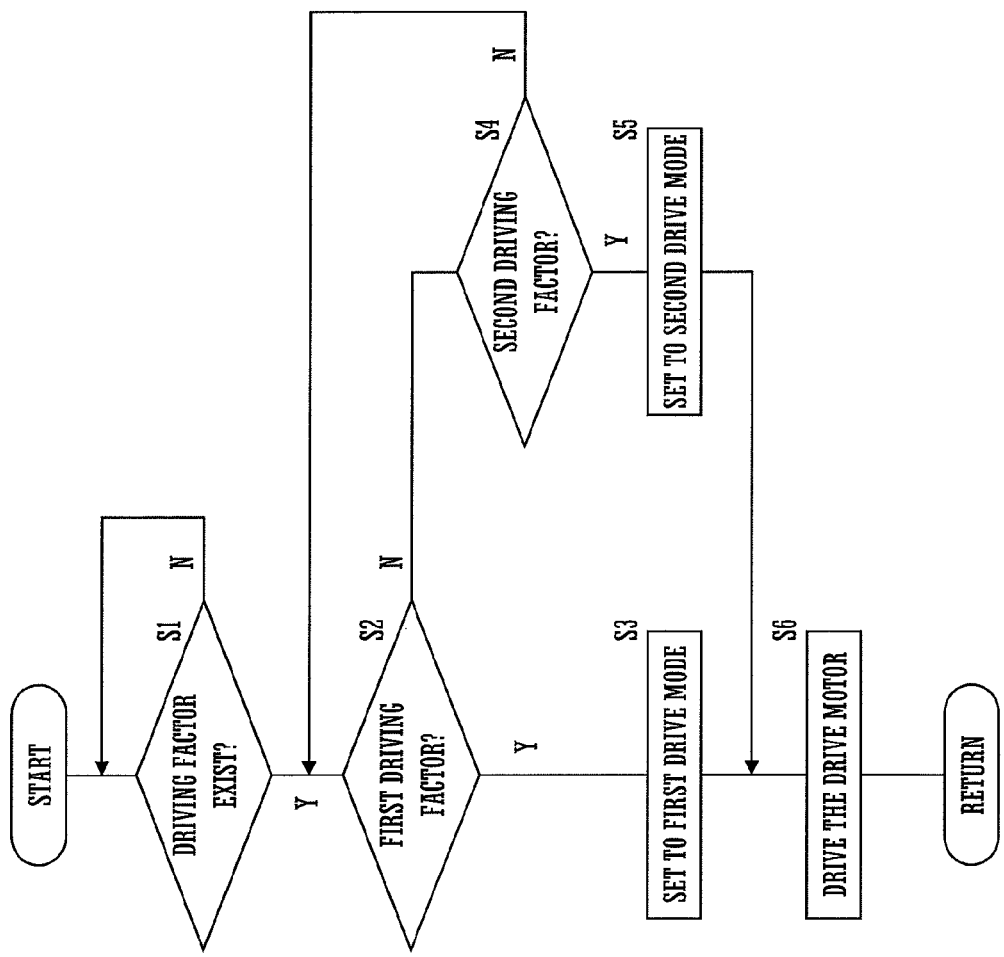
FIG. 8 is a flowchart showing an example of a processing procedure of a control section.

As shown in FIG. 8, when a driving factor causing the arm 15 to move upward is inputted (S1), the control section 20 determines whether the driving factor is among preset first driving factors (S2) or not, and sets up a first drive mode if it is among the first driving factor (S3). Alternatively, if the driving factor is not among the first driving factors in S2 but among second preset driving factors (S4), the control section 20 sets up a second drive mode (S5). The control section 20 then drives the drive motor 14 in the set up drive mode (S6).

As shown in FIG. 9, the first driving factors are factors considered to cause a situation where the arm 15 has fallen down slight from the raised position and is in the neighborhood of the raised position; and such factors include: power turned on; returned from power conservation mode to normal mode; and the ADF 120 closed after once opened, for example.

The second driving factors are factors considered to cause a situation where the arm 15 is at the lowered position; and such factors include: feeding the document(s) from the document load tray 121 to the document conveying path 123 completed; and the maintenance door 129 closed after once opened, for example.

The control section 20, when it causes the arm 15 to move upward, outputs a drive signal in a second excitation mode by which much importance is attached to the reduction of a driving noise of the drive motor 14 in either of occurrences of any of the first driving factors and any of the second driving factors.

As an example, the second excitation mode is a one-two phase excitation mode. Because the torque required when the arm 15 is moved upward is less than that needed when it is moved downward, a noise when the arm 15 is moved upward can be reduced through a reduction of the driving noise of the drive motor 14 achievable.

The first drive mode is a mode in which setting is made to a first predetermined speed by which much importance is attached to the reduction of the driving noise of the drive motor 14; and, as an example, a drive signal of speed 2500 pps, amount of rotation 300 pulses in the one-two phase excitation mode is output.

The second drive mode is a mode in which setting is made to a second predetermined speed by which much importance is attached to the reduction of a contact noise with the regulatory member 1291; and, as an example, a drive signal of speed 1800 pps, amount of rotation 300 pulses in the one-two phase excitation mode is output. In the embodiment, a rotational speed of the drive motor 14 when the arm 15 is moved upward from the lowered position to the raised position is set to a lower speed than when it is moved upward from the neighborhood of the raised position to the raised position. Here, the amount of rotation 300 pulses in the one-two phase excitation mode and the amount of rotation 150 pulses in the two phase excitation mode are equivalent as an amount of rotation of the drive motor 14.

Figure 10:
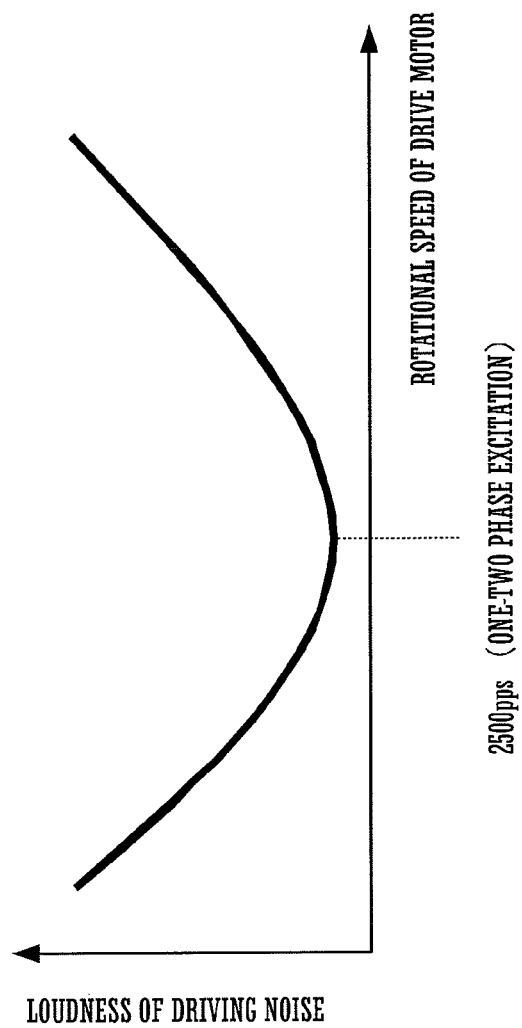
FIG. 10 is a graph showing a relationship between the rotational speed of a drive motor and the loudness of a driving noise.

As shown in FIG. 10, the drive motor 14 used in the embodiment produces the least driving noise when it rotates at the speed of 2500 pps in the one-two phase excitation mode, produces a big noise of low tone when it rotates at a speed slower than 2500 pps, and produces a big noise of high tone when it rotates at a speed faster than 2500 pps.

When the arm 15 is moved upward from the lowered position to the raised position making use of the configuration as above, the drive motor 14 is set to the second speed, that is to say, for example, 1800 pps; this means that the contact with the regulatory member 1291 is made at the speed of, for example, 1800 pps, so that the contact noise with the regulatory member 1291 decreases as compared with a case where the contact with the regulatory member 1291 is made at the first speed, that is to say, for example, 2500 pps.

Further, when the arm 15 is moved upward from the neighborhood of the raised position to the raised position, the drive motor 14 is set to the first speed, that is to say, for example, 2500 pps; however, since a swing angle of the arm 15 is small, the drive motor 14 never reaches the first speed before the arm 15 comes into contact with the regulatory member 1291.

In the above mentioned embodiment, the swing angle of the arm 15 between the lowered position and the raised position is 32 degrees. In the one-two phase excitation mode, the angle within which the arm 15 is swung from the time when the drive motor 14 starts rotating to the time when it reaches the speed of 1800 pps is 17 degrees. The angle within which the arm 15 is supposed to be swung from the time when the drive motor 14 starts rotating to the time when it reaches the speed of 2500 pps is 34 degrees.

For this reason, when the drive motor 14 is set to the speed of 2500 pps and when the arm 15 is moved upward from the lowered position, the speed comes to a speed near the setting-speed 2500 pps at the raised position; however, when it is moved upward from the neighborhood of the raised position, then because the swing angle of the arm 15 is small, the speed never reaches 1800 pps, much less 2500 pps at the raised position.

Therefore, when the arm 15 is moved upward from the neighborhood of the raised position, it follows that the arm 15 comes in contact with the regulatory member 1291 at a low speed, that is to say, less than, for example, 1800 pps even when the setting is made to a high setting-speed, that is to say, for example, 2500 pps, so that the contact noise with the regulatory member 1291 never becomes big. Accordingly, setting the drive motor 14 to the first speed when the arm 15 is moved upward from the neighborhood of the raised position to the raised position permits the reduction of the driving noise of the drive motor 14 without causing the contact noise with the regulatory member 1291 to become big.

In addition, the drive signal inputted to the drive motor 14 to cause the arm 15 to move upward or downward is set to such a value that allows the arm 15 to be swung within an angle greater than the angle within which the arm 15 is to be swung, in order to make sure that the arm 15 is moved to the raised position or the lowered position. On that account, when the arm 15 is moved upward from the neighborhood of the raised position to the raised position, it follows that the drive motor 14 continues driving for a relatively long time even after the arm 15 has come into contact with the regulatory member 1291; however, with the drive motor 14 rotating at the first speed, that is to say, for example, 2500 pps, the driving noise of the drive motor 14 decreases, and hence the noise can be reduced.

Figure 11:
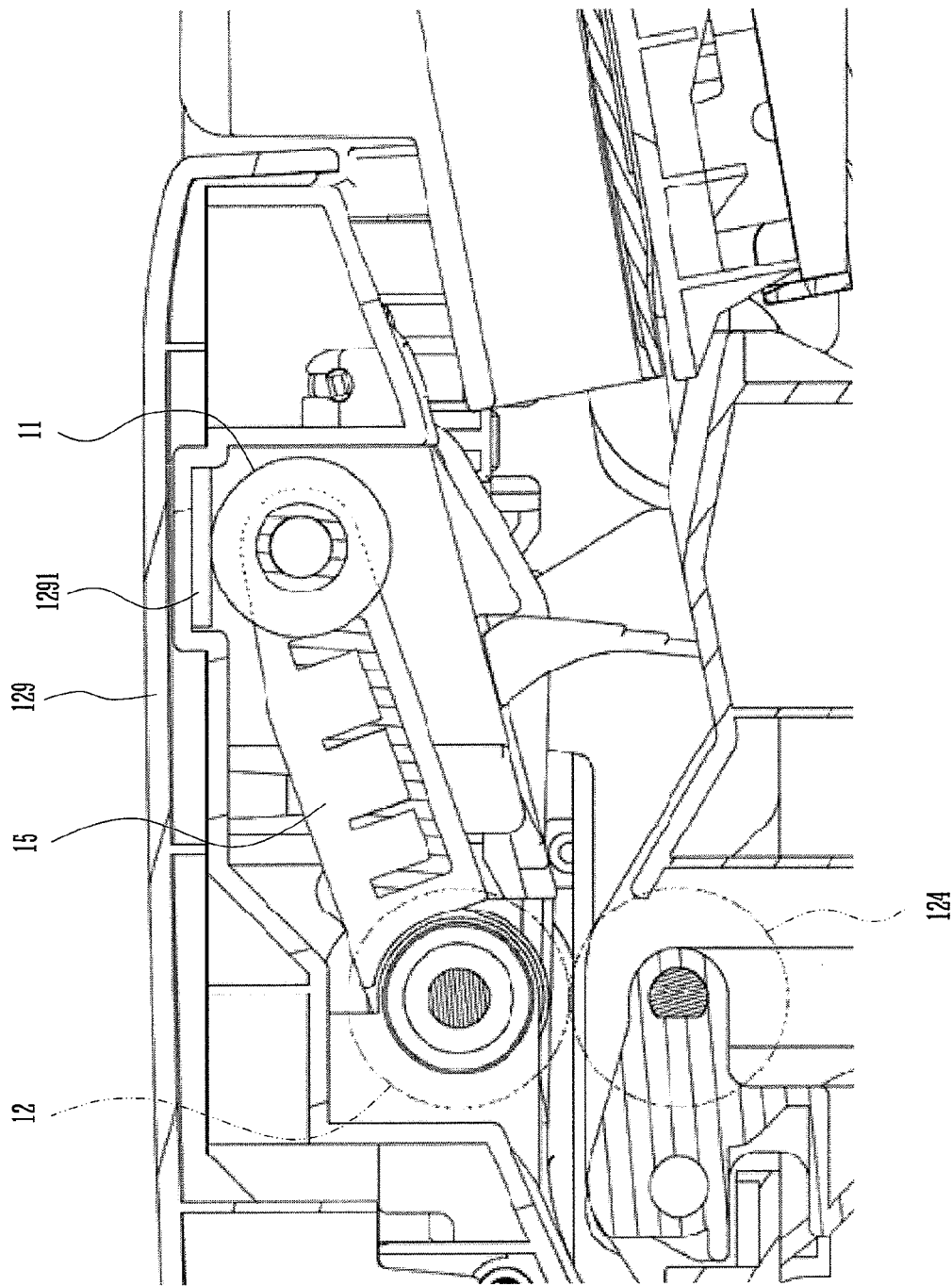
FIG. 11 is an enlarged view of a part of an ADF according to a variation example.

Further, as shown in FIG. 11, the regulatory member 1291 may be configured in such a manner as to come into contact with the circumferential surface of the pickup roller 11 when the arm 15 moved upward reaches the raised position. This contributes to a further reduction of the contact noise with the regulatory member 1291.

Moreover, the present invention can be applied to the paper feeding section 150 installed in the image forming apparatus 100. The pickup roller 85 is caused to move upward and downward by an arm's swing not shown. When the paper feeding section 150 is configured in such a manner as the paper feeding device of the present invention, the paper sheet received in the paper feed cassette 81 onto which an image is to be formed is the sheet substance fed by the paper feeding device; and thus, a noise when the arm is moved upward is reduced. As shown in FIG. 12, the first driving factors include: power turned on; and returned from power conservation mode to normal mode, for example. The second driving factors include: feeding the paper sheet(s) from the paper feed cassette 81 to the first paper conveying path 83 completed; and the paper feed cassette 81 mounted in position from the drawn state, for example.

Besides, the present invention is applicable to the control of drive at the time when the pickup roller 86 feeding the paper sheet(s) placed on the hand-fed paper tray 82 installed in the image forming apparatus 100 is moved upward, thereby making it also possible to reduce a noise when the pickup roller 86 is moved upward.

The above explanation of the embodiment is nothing more than illustrative in any respect, nor should be thought of as restrictive. Scope of the present invention is indicated by claims rather than the above embodiment. Further, it is intended that all changes that are equivalent to a claim 1n the sense and realm of the doctrine of equivalence be included within the scope of the present invention.

What is claimed is:

1. A paper feeding device comprising:
    a pickup roller that performs a paper feeding operation of sending a sheet substance off by rotating while maintaining contact with the sheet substance;
    an arm, of which a first end portion is supported at shaft thereof by an apparatus frame and of which a second end portion supports the pickup roller at shaft thereof, capable of being swung between a lowered position at which the pickup roller comes into contact with the sheet substance and a predetermined raised position at which the pickup roller is separate from the sheet substance;
    a drive motor supplying a driving force for the swing to the arm;
    a regulatory member constraining the arm from moving upward across the raised position; and
    a control section that sets a setting-speed of the drive motor to a first predetermined speed when a first driving factor occurs that causes the arm to move from a position adjacent to the raised position to the raised position, and that sets setting-speed to a second predetermined speed when a second driving factor occurs that causes the arm to move from the lowered position to the raised position, wherein
    the control section changes an excitation mode of the drive motor from a first excitation mode when the arm is moved downward to a second excitation mode when the arm is moved upward, and
    the first excitation mode is a two-phase excitation mode and the second excitation mode is a one-two-phase excitation mode.

2. The paper feeding device as claimed in claim 1, wherein the second speed is a speed lower than the first speed.

3. The paper feeding device as claimed in claim 1, wherein the regulatory member comes into contact with a circumferential surface of the pickup roller when the arm moved upward reaches the raised position.

4. An image forming apparatus provided with the paper feeding device as claimed in claim 1.

5. A paper feeding device comprising:
    a pickup roller that performs a paper feeding operation of sending a sheet substance off by rotating while maintaining contact with the sheet substance;
    an arm, of which a first end portion is supported at shaft thereof by an apparatus frame and of which a second end portion supports the pickup roller at shaft thereof, capable of being swung between a first position at which the pickup roller comes into contact with the sheet substance and a predetermined second position at which the pickup roller is separate from the sheet substance;
    a drive motor supplying a driving force for the swing to the arm; and
    a control section that sets a setting-speed of the drive motor to a first predetermined speed when the arm is moved from a third position between the first position and the second position to the second position, and that sets the setting-speed to a second predetermined speed when the arm is moved from the first position to the second position, the second speed being a speed lower than the first speed.

6. The paper feeding device as claimed in claim 5, wherein the control section changes an excitation mode of the drive motor from a first excitation mode when the arm is moved downward to a second excitation mode when the arm is moved upward, and the first excitation mode is a two phase excitation mode and the second excitation mode is a one-two phase excitation mode.

7. The paper feeding device as claimed in claim 5, further comprising:
a regulatory member constraining the arm from moving upward across the second position; wherein
the regulatory member comes into contact with a circumferential surface of the pickup roller when the arm moved upward reaches the second position.

8. An image forming apparatus provided with the paper feeding device as claimed in claim 5.

9. A paper feeding device comprising:
a pickup roller that performs a paper feeding operation of sending a sheet substance off by rotating while maintaining contact with the sheet substance;
an arm, of which a first end portion is supported at shaft thereof by an apparatus frame and of which a second end portion supports the pickup roller at shaft thereof, capable of being swung between a lowered position at which the pickup roller comes into contact with the sheet substance and a predetermined raised position at which the pickup roller is separate from the sheet substance;
a drive motor supplying a driving force for the swing to the arm;
a control section that changes an excitation mode of the drive motor from a first excitation mode when the arm is moved downward to a second excitation mode when the arm is moved upward, wherein
the first excitation mode is a two-phase excitation mode and the second excitation mode is a one-two-phase excitation mode.

10. The paper feeding device as claimed in claim 9, further comprising:
a regulatory member constraining the arm from moving upward across the raised position; wherein
the regulatory member comes into contact with a circumferential surface of the pickup roller when the arm moved upward reaches the raised position.

11. An image forming apparatus provided with the paper feeding device as claimed in claim 9.

* * * * *